(No Model.)  7 Sheets—Sheet 1.

T. CARNEY.
CASH REGISTER AND INDICATOR.

No. 538,658. Patented May 7, 1895.

Witnesses
Martin H. Olsen
Albert H. ...

Inventor
Thomas Carney
by Edward ...
his atty (No Model.) 7 Sheets—Sheet 3.

T. CARNEY.
CASH REGISTER AND INDICATOR.

No. 538,658. Patented May 7, 1895.

Witnesses
Martin H. Olsen
Albert H. Meads

Inventor
Thomas Carney
by Edward Rector
his atty (No Model.)

T. CARNEY.
CASH REGISTER AND INDICATOR.

No. 538,658.

7 Sheets—Sheet 4.

Patented May 7, 1895.

Witnesses
Martin H. Olsen.
Albert H. Meads

Inventor
Thomas Carney
by Edward Rector
his atty.

(No Model.) 7 Sheets—Sheet 5.

T. CARNEY.
CASH REGISTER AND INDICATOR.

No. 538,658. Patented May 7, 1895.

Witnesses
Martin H. Olsen.
Albert N. Meads

Inventor
Thomas Carney
by Edward Rector
his atty.

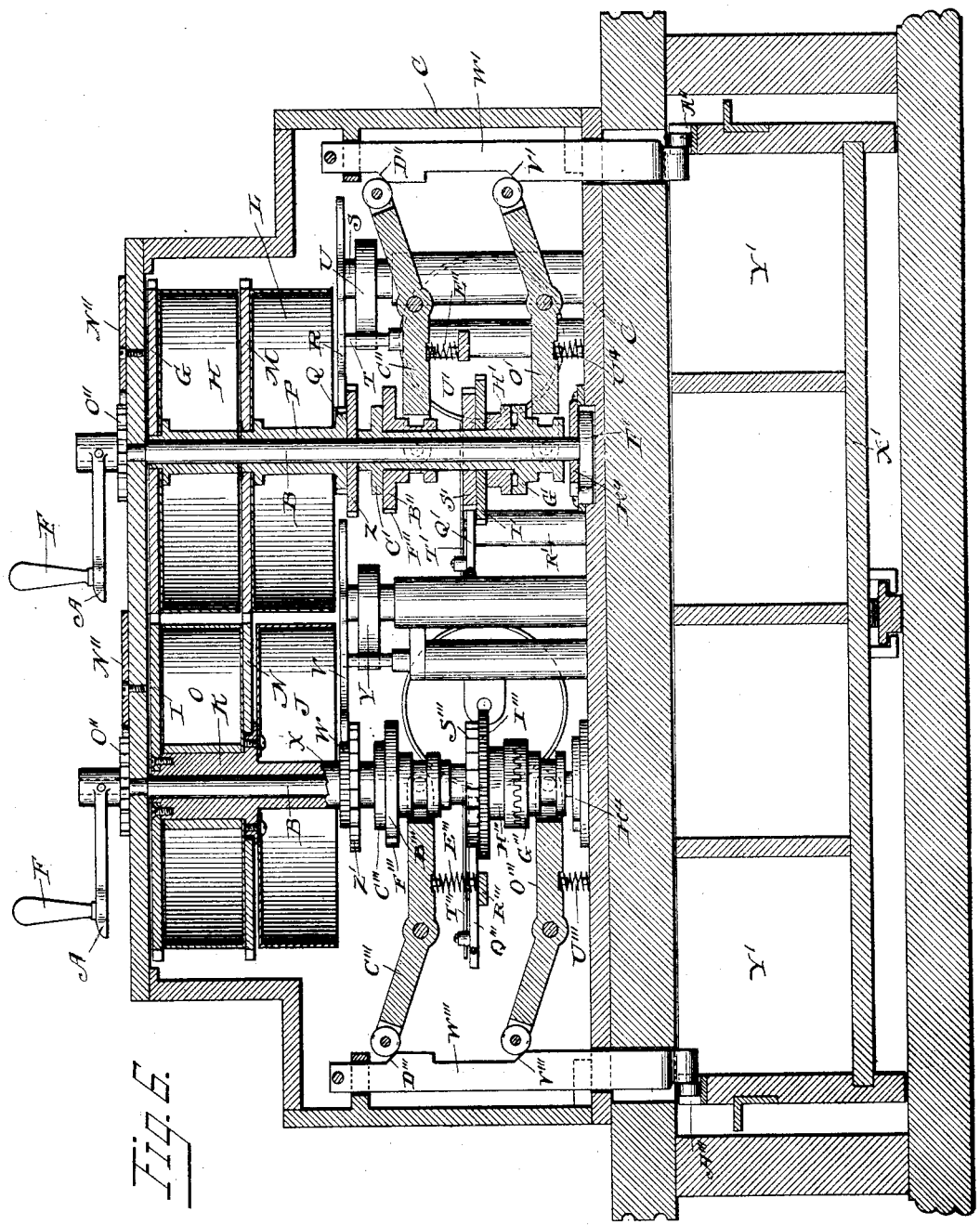

(No Model.) 7 Sheets—Sheet 7.
T. CARNEY.
CASH REGISTER AND INDICATOR.
No. 538,658. Patented May 7, 1895.
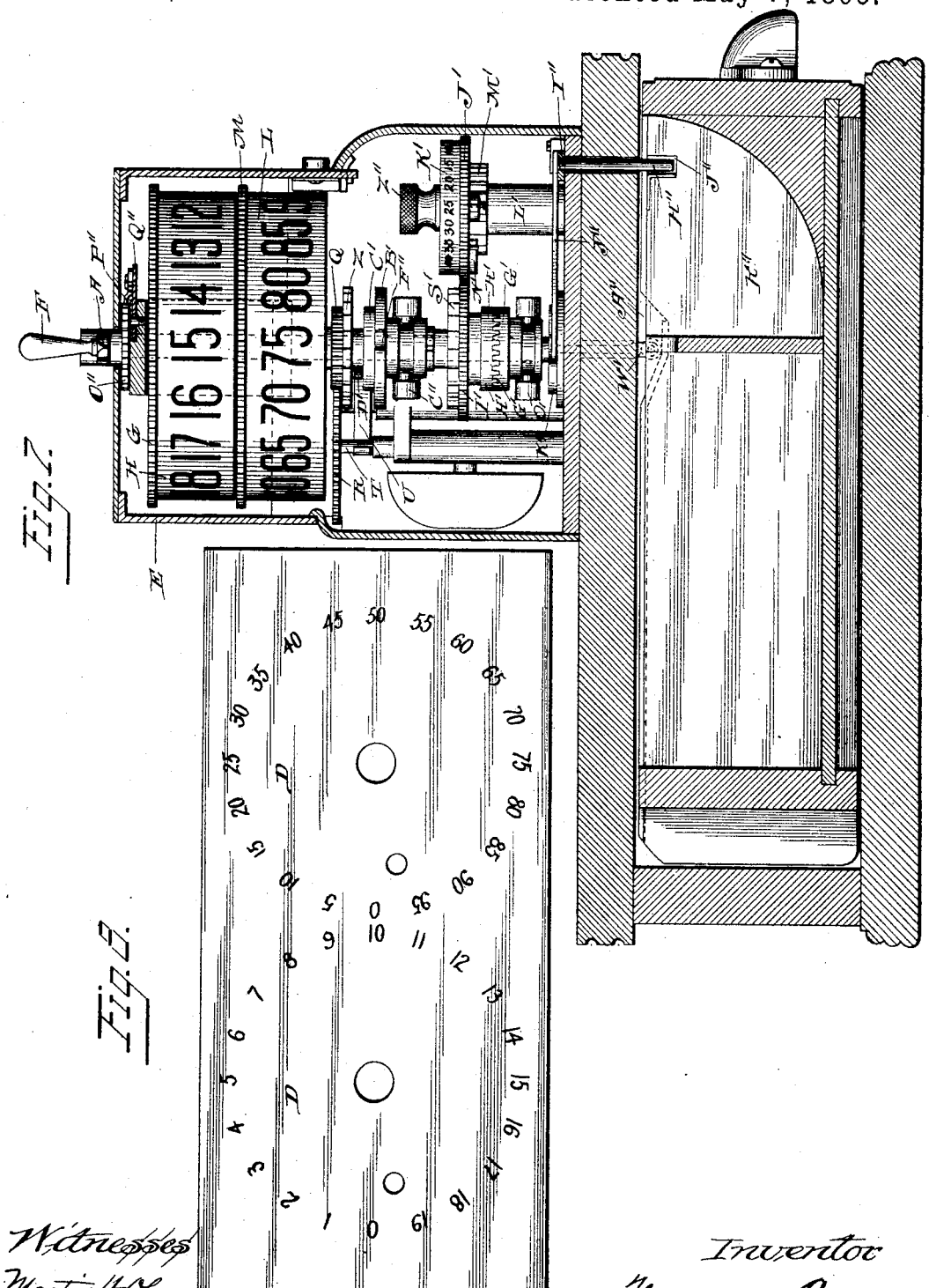

UNITED STATES PATENT OFFICE.

THOMAS CARNEY, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 538,658, dated May 7, 1895.

Application filed September 24, 1894. Serial No. 523,887. (No model.)

*To all whom it may concern:*

Be it known that I, THOMAS CARNEY, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

My invention relates to that class of machines in which the indicating and registering mechanisms are actuated by a pointer moving over a dial, as distinguished from machines in which such mechanisms are actuated by a series of keys; and it consists in certain novel constructions, arrangements, combinations and modes of operation of the parts which will be hereinafter fully described and particularly pointed out in the claims.

Figure 1:
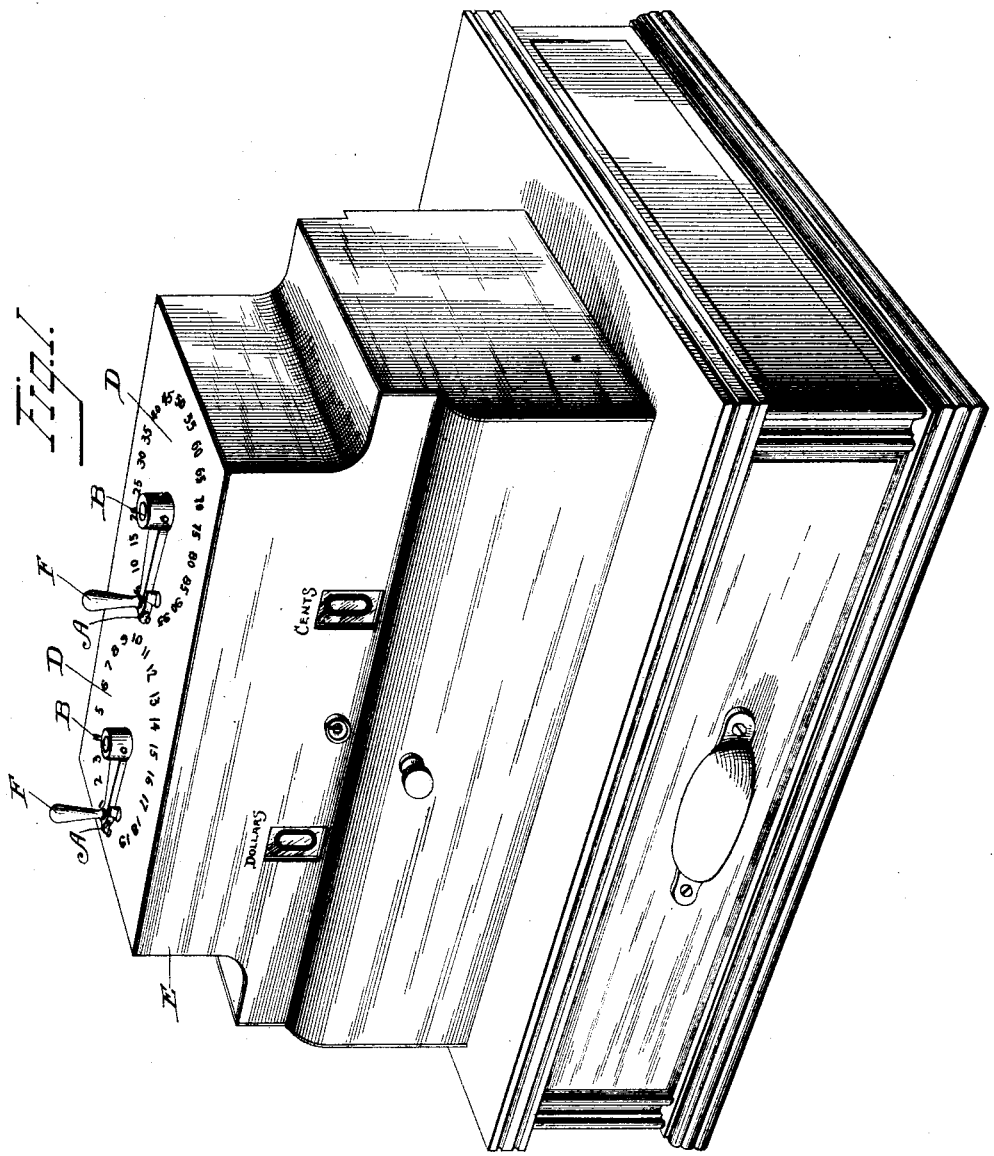
Figure 2:
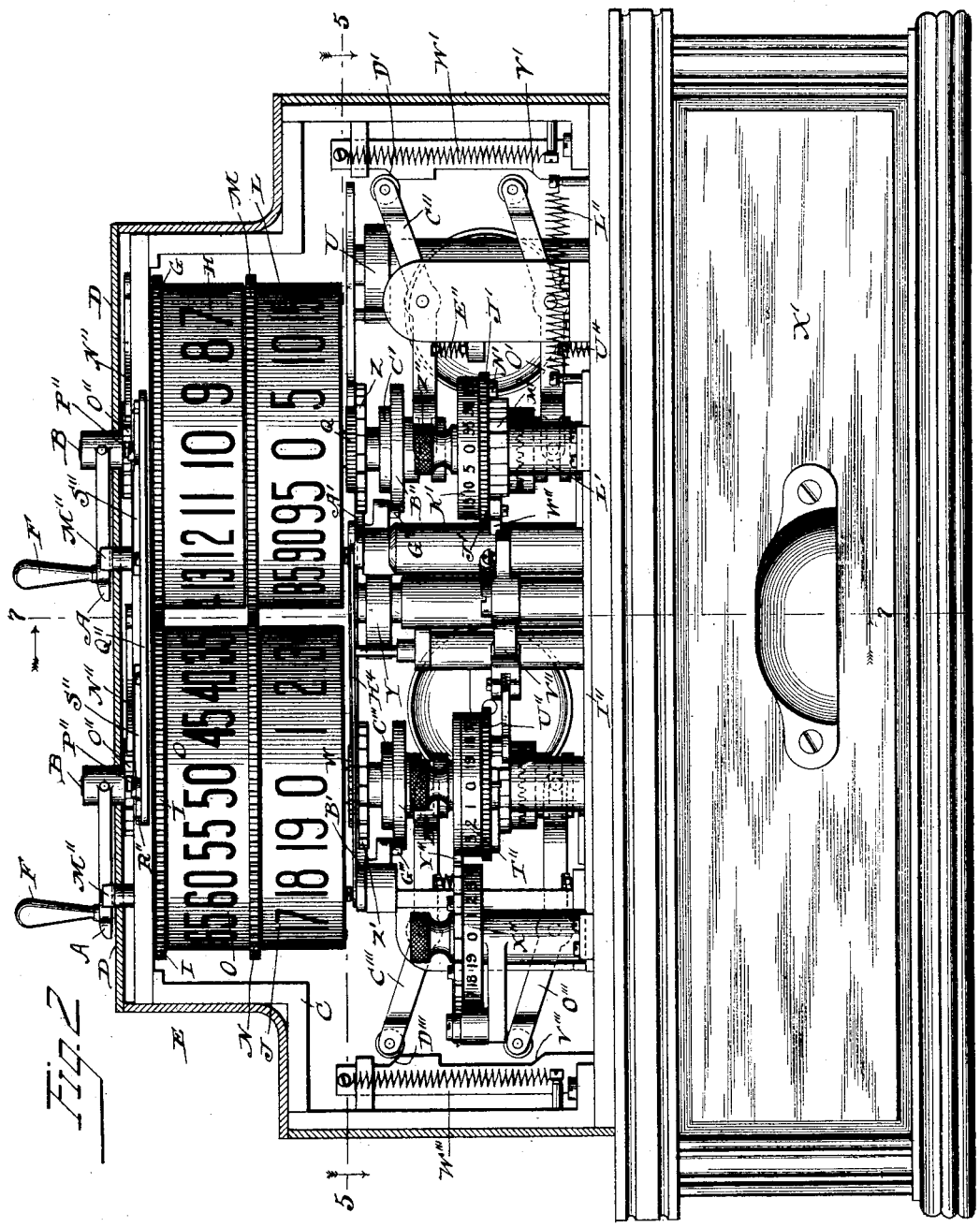
Figure 3:
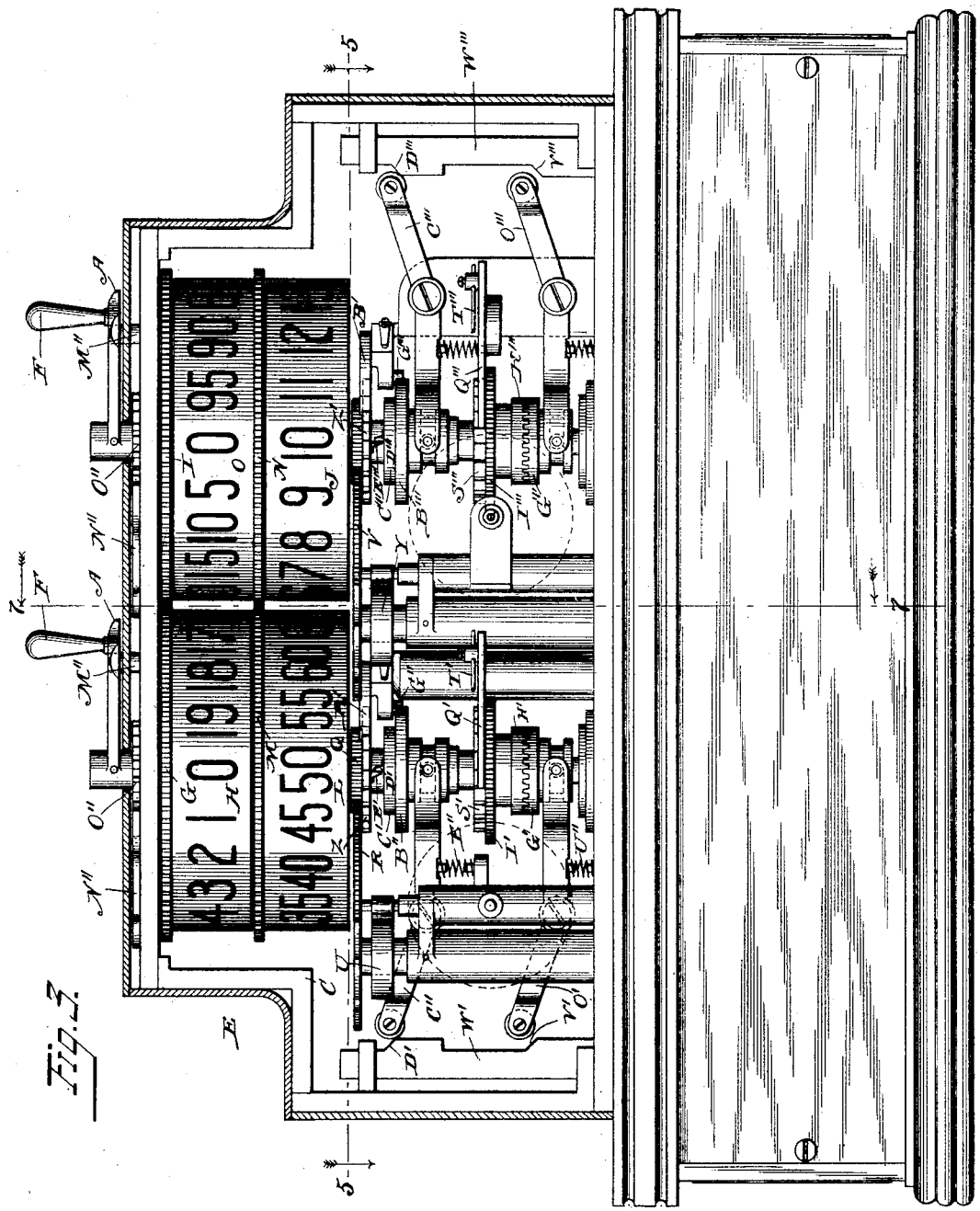
Figure 4:
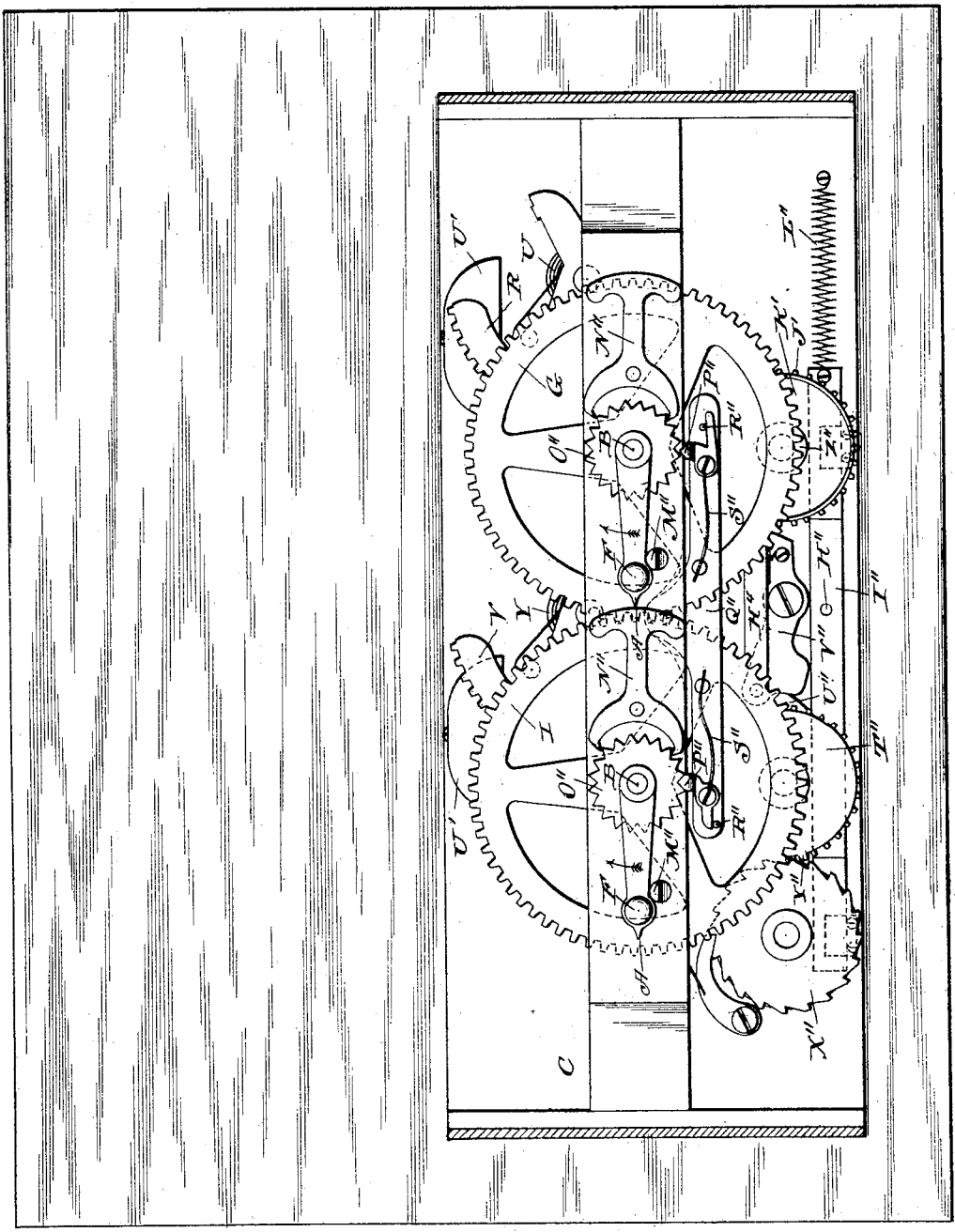
Figure 5:
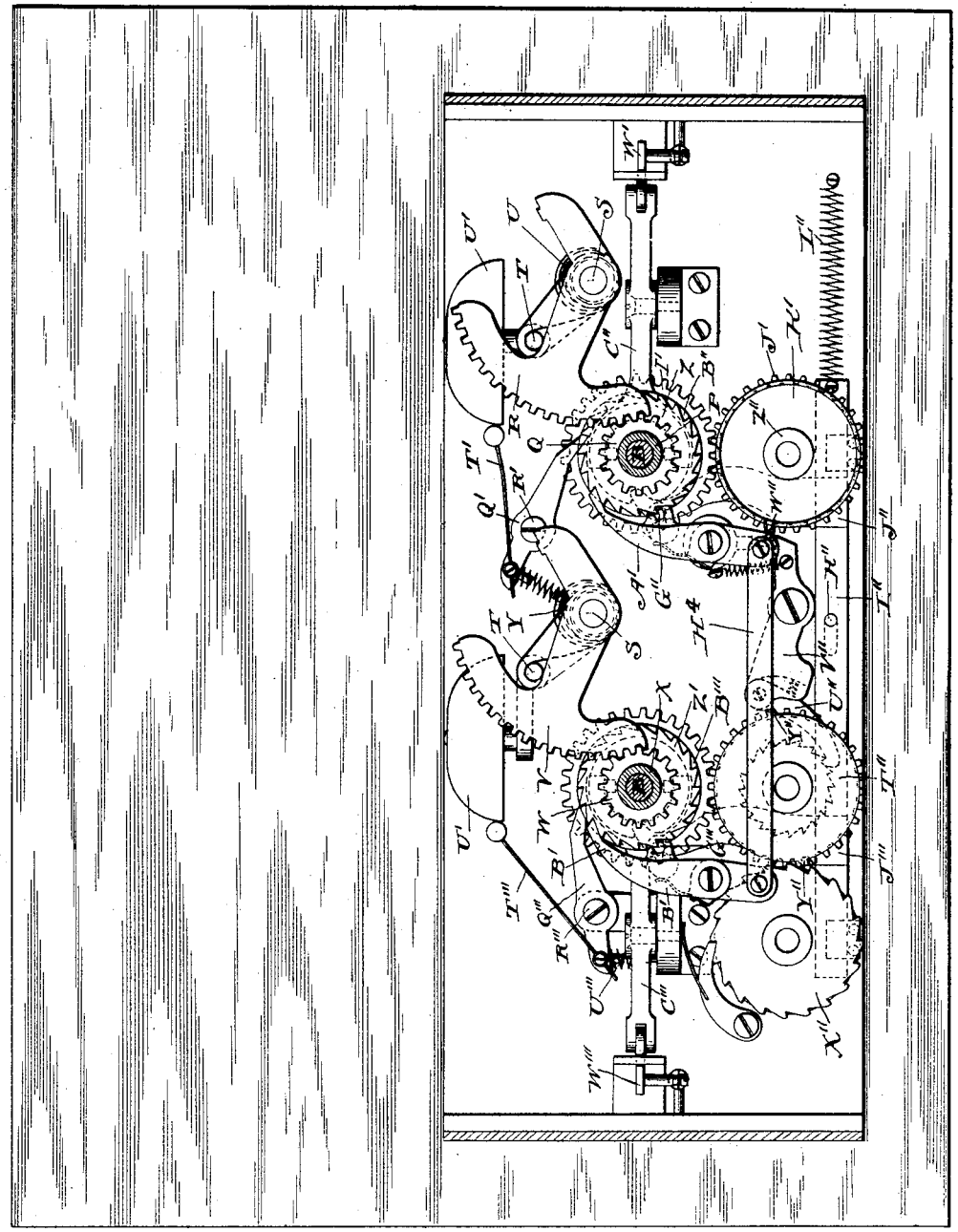

In the accompanying drawings, Figure 1 is a perspective view of the machine within its casing; Fig. 2, a front elevation with the casing in section to expose the parts within; Fig. 3, a corresponding rear elevation; Fig. 4, a top plan view with the top of the casing, bearing the numbered dials over which the pointers move, removed; Fig. 5, a horizontal section approximately on the line 5 5 of Figs. 2 and 3; Fig. 6, a middle transverse vertical section; Fig. 7, a vertical section approximately on the line 7 7 of Figs. 2 and 3; and Fig. 8, a plan view of the top plate of the casing, showing the dials.

The same letters of reference are used to indicate identical parts in all the figures.

There are two sets of mechanisms, for indicating and registering different denominations, as dollars and cents, operated by two independent handles. These handles consist of pointers A A fast upon the upper ends of vertical shafts B B journaled at their upper and lower ends in bearings in the framework C and co-operating with dials D D upon the top plate of the casing E. The pointers have suitable knobs F for moving them over the dials. In the present instance the right hand mechanism may be taken to be that for indicating and registering cents, and the left hand one dollars. Each mechanism has two indicating wheels or drums, one adapted to expose its numbers at a sight opening in the front plate of the casing, and the other to expose its numbers at a similar opening in the rear plate thereof. These indicators are mounted upon the two vertical shafts and are free to turn thereon.

A gear G fast upon the upper side of the upper one H of the two right hand indicators meshes with a gear I fast upon the upper end of the hub or sleeve K of the lower one J of the two left hand indicators, such sleeve extending upward through the hub of the upper left hand indicator O, Fig. 6. The lower one L of the two right hand indicators has fast upon its upper side, between it and the indicator H, a gear M which meshes with a gear N fast upon the under side of the upper one O of the two left hand indicators. The result of this connection of the two sets of indicators is that the indicators H and J are geared together and move in unison, while the indicators L and O are likewise geared together.

The numbers are so arranged upon the several indicators that when a given number upon the upper right hand indicator is exposed at its window in the front of the casing the corresponding number upon the lower left hand indicator will be exposed at its window in the rear side of the casing, and when a given number upon the upper left hand indicator is exposed at the front the corresponding number upon the lower right hand one will be exposed at the rear. At each operation of the machine, therefore, the indication will be displayed at both front and rear of the machine.

The hub P of the lower right hand indicator L has fast upon its lower end a gear Q which meshes with a gear-toothed segment R pivoted upon the upper end of a post S and yieldingly held in the position shown, against a stop T, by means of a spring U coiled around the hub of the segment and secured thereto at one end and at its other to the stop T. The indicator L, and consequently the indicator O geared to it, are held in normal position by this spring with their ciphers or blank spaces exposed at the windows in the casing. The lower left hand indicator and the upper right hand one are held in normal position in a similar manner, by means of a segment V meshing with a gear W fast upon the lower end of the hub X of the indicator J and a spring Y acting upon the segment. The hubs of the indicators L and J also have fast upon their lower ends, immediately below the gears Q and W, ratchets Z and Z' with which co-operate holding pawls A' B', Fig. 5, to temporarily hold the indicators in the positions to which they may be moved against the tension of the springs.

Inasmuch as the two mechanisms are substantially alike a detailed description of the right hand one will suffice for both. The vertical shaft B of this right hand mechanism has fast upon it immediately below the ratchet Z a disk C' which has a projection D' upon its upper side, Fig. 3, adapted to co-operate with a projection E' upon the lower side of the ratchet Z, by means of which when the pointer A upon the upper end of the shaft is turned forward over its dial the indicator L will be carried forward with the shaft to expose at its window in the casing the number at which the pointer may be arrested. The engagement of the pawl A' with the ratchet Z serves to hold the indicator from return movement under the stress of its spring when the pointer is released in the manner hereinafter described and returned with the shaft to normal position. A coiled spring F' surrounding and connected at one end to the lower end of the shaft B, Fig. 6, operates to return the latter and the pointer to such position when they are released.

Splined upon the lower end of the shaft B is one member G' of a clutch whose second member H' is fast upon the under side of a gear I' loose upon the shaft and meshing with a gear J' Figs. 2 and 3, loose upon the hub of the registering wheel K' which is mounted upon a post L'. The hub of this wheel has fast upon its lower end, beneath the gear J', a ratchet M' with which co-operates a pawl N' pivoted to the under side of the gear and spring-pressed against the ratchet, to cause the gear to carry the wheel with it in a forward direction but also permit the wheel to be moved forward independently of the gear, for a purpose hereinafter referred to. The clutch member G' is shifted into and out of engagement with the member H' by means of a shifter O' pivoted at its middle to a vertical support upon the base plate and having a forked end provided with pins fitting in a circumferential groove in the hub of the member G' as usual. The pawl Q' pivoted to a post R' and spring-pressed against a ratchet S' fast upon the upper side of the gear I' prevents backward movement of the gear and registering wheel. A striker T' fast upon the pawl Q' is vibrated against a gong U' to sound the same as the ratchet S' is turned forward and its teeth moved under the pawl. A coiled spring U⁴ beneath the inner end of the shifter O' normally holds the clutch members G' H' in engagement, so that when the pointer and shaft are turned forward from normal position the gear I' will be turned with them and the registering wheel advanced to register the amount represented by the number upon the dial to which the pointer is turned. When the pointer is released from the hand of the operator the continued engagement of the clutch members will cause the ratchet S' and pawl Q' to hold the shaft and pointer from return movement, under the influence of the spring F' at the lower end of the shaft, until the clutch members are disengaged. This disengagement is effected by means of a cam or shoulder V' upon a vertically sliding plate W' co-operating with the outer end of the shifter O'. When this plate is lifted the cam V' will lift the outer end of the shifter and depress its inner end against the resistance of the spring U⁴ and disengage the clutch, whereupon the spring F' will restore the shaft and pointer to initial position. The vertically moving plate W' is actuated by the money drawer X' of the machine, which is confined in the base or compartment Y' upon which the framework of the machine rests. As seen in Figs. 6 and 7 the lower end of the plate W' extends down through an opening in the top of this drawer compartment and carries an anti-friction roller co-operating with one of the sides of the drawer. The side of the drawer is provided with a recess in its upper edge at A'' in which the lower end of the plate W' rests when the drawer is in closed position. When the drawer is pulled outward the inclined rear side of the recess rides under the roller and lifts the plate and causes the cam V' to move the shifter and disengage the clutch in the manner before explained. In this manner after a pointer has been turned forward to a given point, to make an indication and registration, the opening of the drawer will release it and permit its spring to return it to normal position.

As heretofore stated the engagement of the pawl A' with the ratchet Z will hold the indicator in the position to which it has been moved, after the shaft and pointer have been released and returned to normal position. The opening of the money drawer therefore has no effect upon the indication, which remains displayed after the drawer is closed. The indicator is released and returned to normal position at the next forward movement of the pointer, to effect a new indication and registration, in the following manner and by the following means.

Splined upon the downwardly extended hub of the disk C' by whose projection D' the indicator is turned forward, Fig. 3, as before explained, is a vertically movable disk B'' having a pendent hub provided with a circumferential groove in which fits pins in the forked end of a second shifter C'' similar to the shifter O' before described, pivoted at its middle to the same support, and co-operating at its outer end with a cam D'' upon the same vertically movable plate W'. A coiled spring E'' beneath the shifter yieldingly holds its inner end and the disk B'' in their upper normal position, and when the drawer is opened and the plate W' lifted the cam D'' will lift the outer end of the shifter and lower the disk. The periphery of the disk is provided at one point with a notch F''', Fig. 6, in which, when the pointer, shaft and disk are in normal position, with the pointer standing at zero on the dial, fits a pin G'' upon the under side of the pawl A' which engages the ratchet Z, and, as before explained, holds the indicator from return movement. At the first forward movement of the pointer this notch in the disk will be carried away from the pin and as the latter is forced outward and caused to ride over the periphery of the disk the pawl will be disengaged from the ratchet and the indicator released and returned to initial or zero position by the spring U acting upon the segment R. It may or may not return all the way to initial position, but will move backward until it either reaches such position or until its projection E' contacts with the forwardly moving projection D' on the disk C'.

Inasmuch as during the forward movement of the indicator the pawl A' is held out of engagement with the ratchet Z by the disk B'' just described it follows that, until the pawl is permitted to re-engage the ratchet, the indicator will be held from return movement solely by the projection D' upon the disk C', by which it has been turned forward. As before explained, the pointer and shaft and disk C' remain in the forward position to which they are turned until the drawer is opened and the clutch members G' H' disengaged by the shifter O', and when the drawer is opened and the release of those parts thus effected the shifter C'' simultaneously throws the disk B'' downward and disengages it from the pin G'' upon the under side of the pawl A', thereby permitting the pawl to re-engage the ratchet Z and hold the indicator in position after the pointer and parts moving with it have returned to initial position.

The pawl A' is connected by a link H⁴, Figs. 2 and 5, to the pawl B' which co-operates with the ratchet Z' of the indicator J of the left hand set, which pawl B' is provided with a pin G''' similar to the pin G'' upon the pawl A' and co-operating with a disk B''' upon the left hand shaft B, so that whenever either pointer is turned forward the indicators of both sets will be released.

From the foregoing description it will be understood that, with both indicators set to make an indication representing dollars and cents, at the first forward movement of either pointer both indicators will be released and returned to normal position; and that, after one or both pointers have been turned forward the necessary distance to effect the new indication, the opening of the money drawer will release them and permit them to return to initial position, while the indicators will remain in indicating position after the drawer is closed and until one of the pointers is again turned forward.

The parts co-operating with the left hand set of indicators and corresponding to the parts above described in connection with the right hand ones need not be referred to in detail. They have been indicated on the drawings by letters of reference corresponding to the letters on the right hand set but in the third power, thus A''', B''', C''', &c.

Inasmuch as the drawer is to be pulled open by hand, it follows that, so far as the operations above described are concerned, it may or may not be provided with a lock; but it is preferable to employ a lock for it controlled by the indicating and registering mechanisms, and the one illustrated in the drawings may be now described. It consists of a pendent bolt H'' secured to a laterally sliding plate I'' mounted in guideways upon the base plate of the framework near its forward edge, Figs. 4, 5 and 7. The bolt H'' extends down through an opening in the top of the drawer compartment and co-operates at its lower end with a recess J'' in one of the partitions K'' of the drawer. When the bolt stands in this recess the drawer is locked, and when the plate I'' is slid laterally of the machine the bolt will be carried out of the recess and the drawer unlocked. The plate I'' has rigidly secured to it two rearwardly extending arms, J'', Figs. 5 and 7, whose curved rear ends co-operate respectively with disks K⁴ fast upon the lower ends of the shafts B below the lower members of the two clutches. Each of the disks K⁴ is provided with a notch, in which notches the rear ends of the arms J'' rest when the pointers and shafts are in initial position, being yieldingly held in engagement therewith by a spring L'' pulling the plate I'' to the right. When either pointer is turned forward from initial position the plate I'' will be slid to the left and the locking bolt H'' be disengaged from the recess in the drawer. When the drawer is pulled out and the pointers and shafts released and returned to initial position the notches in the disks K⁴ will be brought into position to receive the ends of the arms J'' again, but the engagement of the locking bolt H'' with the left side of the partition K'' of the drawer will prevent the plate I'' returning to normal position under the influence of its spring L'' until the drawer is pushed in again, whereupon as the recess or notch in the partition comes opposite the bolt the plate I'' will spring to the right and the drawer become locked.

In normal position the pointers A A rest against stops M'' M'' projecting upward from the top cross plate of the framework through the top of the casing, Fig. 4. For the purpose of preventing the pointers being returned too quickly and violently to normal position when released there are provided two escapement levers N'' N'' pivoted to the top plate of the framework and co-operating with toothed wheels O'' O'' fast upon the respective shafts B B below the pointers. For the purpose of preventing both pointers being turned forward at the same time there are provided two locking pawls P″ P″ pivoted to a plate Q″ near its opposite ends and co-operating with the toothed wheels O″ O″. The plate Q″ is pivoted near its middle to the top plate of the framework, and the adjustment is such that when one pawl P″ is disengaged from its wheel O″ the other pawl must be engaged with the other wheel. The pawls are free to turn upon their pivots in one direction but not in the other, owing to stops R″ R″ with which they contact and against which they are yieldingly held by springs S″ S″.

It will be seen that when the pointers are turned forward, in the direction of the arrows, the pawls cannot yield on their pivots, so that when either pointer is moved the other will be locked. When, however, the pointers are released the pawls are free to yield on their pivots in their opposite directions, to permit the pointers to simultaneously return to normal position under the influence of their springs.

At each complete revolution of the cents registering wheel K′ one dollar will be transferred to and added upon the dollar registering wheel T″ by means of a transfer pawl U″, Fig. 5, pivoted to the left hand end of a lever V″ whose right hand end co-operates with a projection W″ upon the wheel K′ at each complete revolution of the latter; while at each half revolution of the wheel T″ the wheel X″ registering tens of dollars will be advanced one number by projections Y″ upon the wheel T″ which engage the ratchet of the wheel X″.

As before explained, the gear J′ by which the wheel K′ is actuated is loose upon the hub of the wheel and carries a pawl N′ which co-operates with a ratchet M′ fast upon the lower end of the hub of the wheel. This connection causes the gear to turn the wheel forward with it, but also permits the wheel to be turned forward independently of the gear, and the wheel has upon the upper end of its hub a thumb piece Z″ by which it may be so turned independently of the gear to re-set it to zero at any time desired. The dollar registering wheel is similarly connected to its actuating gear, so that it may likewise be readily re-set to zero, as may also the wheel X″, which has no actuating gear but is intermittently actuated by the wheel T″.

Having thus fully described my invention, I claim—

1. In a cash register and indicator, the combination of an oscillatory operating shaft, a handle or pointer moving over a dial, for turning the shaft in one direction and a spring for re-setting it, a clutch member turning with the shaft, a second member loose upon the shaft, a ratchet and pawl for preventing backward movement of the loose clutch member, a money drawer, and a shifter for the clutch actuated by the drawer to break the clutch and permit the shaft to be re-set by its spring.

2. In a cash register and indicator, the combination of an oscillatory operating shaft, a handle or pointer moving over a dial, for turning the shaft in one direction and a spring for re-setting it, a clutch member splined upon the shaft, a second member loose upon the shaft, a gear wheel and ratchet turning with the latter member, a register driven by the gear, a pawl co-operating with the ratchet to prevent backward movement of the gear and clutch member, a money drawer, and a shifter for the first clutch member actuated by the drawer to break the clutch upon the movement of the drawer and permit the shaft and pointer to be re-set by their spring.

3. In a cash register and indicator, the combination of the vertical shaft B having the pointer A co-operating with the dial, the clutch member G′ splined upon the shaft, the member H′ loose thereon and the ratchet and pawl for preventing backward movement of it, the shifter O′ for the member G′, the money drawer, and the vertically sliding plate W′ actuated by the drawer and having the cam shoulder V′ co-operating with the shifter O′, substantially as described.

4. In a cash register and indicator, the combination of an oscillatory operating shaft, a handle or pointer fast thereon and co-operating with a dial, a re-setting spring therefor, an indicator loose upon the shaft and a spring for re-setting it, means intermediate the shaft and indicator for turning the latter with the shaft in one direction, a ratchet and pawl for holding the indicator in the position to which it may be moved by the shaft, and means for disengaging the pawl from the ratchet at the first forward movement of the shaft and permitting its re-engagement therewith when the pointer begins its backward movement.

5. In a cash register and indicator, the combination of an oscillatory operating shaft, a handle or pointer fast thereon and co-operating with a dial, a re-setting spring therefor, an indicator loose upon the shaft and a re-setting spring for it, means intermediate the shaft and indicator for turning the latter with the shaft in one direction, a ratchet and pawl for holding the indicator in the position to which it may be moved by the shaft, a money drawer, means controlled by the drawer for holding the pointer and shaft in the position to which they may be turned, and means actuated by the shaft to disengage the pawl from the ratchet at the first forward movement of the shaft and permit it to re-engage it when the pointer and shaft are released by movement of the drawer.

6. In a cash register and indicator, the combination of an oscillatory operating shaft, a handle or pointer for turning the same in one direction and a spring for re-setting it, an indicator loose upon the shaft and a re-setting spring for it, means intermediate the shaft and indicator for turning the latter with the shaft in one direction, a ratchet and pawl for holding the indicator in the position to which it may be moved by the shaft, a money drawer, means controlled by the drawer for holding the pointer and shaft in the position to which they may be turned, a disk splined upon the shaft and provided with a notch in which a projection upon the pawl rests when the parts are in normal position, by which disk the pawl is disengaged from the ratchet when the shaft is turned forward, and a shifter actuated by the drawer to slide the disk out of engagement with the pawl when the drawer is moved, to permit the pawl to re-engage the ratchet.

7. In a cash register and indicator, the combination of the shaft B having the pointer A co-operating with a dial, a re-setting spring F' for the shaft, the clutch member G' splined upon the shaft, the co-operating clutch member H' loose thereon and the ratchet and pawl for preventing backward movement of it, the shifter O' for the member G', the indicator L loose upon the shaft, the re-setting spring therefor, the part D' turning with the shaft and co-operating with a part turning with the indicator to carry the latter forward with the shaft, the ratchet Z turning with the indicator, the pawl A' co-operating therewith to prevent backward movement of the indicator, the sliding disk B'' turning with the shaft, having the notch and co-operating with the pawl A', the shifter C'' for the disk, the money drawer, and the vertically sliding plate W' actuated thereby and having the cam shoulders co-operating with the shifters O' and C'' for the purpose described.

8. In a cash register and indicator, the combination of the shaft B having the pointer A co-operating with the dial, a re-setting spring F' for the shaft, the clutch member G' splined upon the shaft, the co-operating clutch member H' loose thereon and the ratchet and pawl for preventing backward movement of it, the shifter O' for the member G', the indicator L loose upon the shaft, the ratchet Z and gear Q turning with the indicator, the segment R meshing with the gear, the spring U acting on the segment, the disk C' fast upon the shaft and having the projection D'' co-operating with the projection E' on the ratchet, the pawl A' co-operating with the ratchet, the sliding disk B'' turning with the shaft, having the notch in its periphery and co-operating with a pin G'' upon the pawl A', the shifter C'' for the disk B'', the money drawer, and the vertically reciprocating plate W' having the cam shoulders V' D'' co-operating with the shifters O' and C'' and extending at its lower end into the drawer-compartment and carrying a roller co-operating with a recess in the side of the drawer, substantially as described.

9. In a cash register and indicator, the combination of the two operating shafts B B having the pointers A A co-operating with the dials, the indicators H L loose upon one shaft and the indicators J O loose upon the other, the indicator H being geared to the indicator J, and the indicator L to the indicator O, re-setting springs for the indicators, connections between each shaft and one of its indicators for causing the shaft to carry the indicator forward with it, a pawl and ratchet co-operating with one indicator on each shaft to prevent backward movement of it, a connection between the two pawls to cause them to move into and out of engagement with the ratchets in unison, and means actuated by the shafts to disengage the pawls from the ratchets at the forward movement of either shaft and permit their re-engagement at the backward movement of the shafts, substantially as described.

10. In a cash register and indicator, the combination of the two operating shafts B B having the pointers A A co-operating with the dials, the indicators H L loose upon one shaft and the indicators J O loose upon the other, the indicator H being geared to the indicator J, and the indicator L to the indicator O, re-setting springs for the shafts and indicators, connections between each shaft and one of its indicators for causing the shaft to carry the indicator forward with it, the ratchets Z Z' turning with the indicators L J, the pawls A' B' co-operating with said ratchets and connected by the link H⁴, the disks B'' B''' splined upon the shafts beneath the ratchets and pawls and co-operating with the pawls, the shifters C'' C''' for disengaging the disks from the pawls, the clutch members G' G''' splined upon the lower ends of the shafts, the members H' H''' loose thereon, the ratchets and pawls for preventing backward movement of the members H' H''', the shifters O' O''' for the members G' G''', the money drawer, and the vertically sliding plates W' W''' actuated thereby and provided with the cams V' D'' and V''' D''' co-operating with the shifters O' C'' and O''' C''', substantially as described.

11. In a cash register and indicator, the combination, with the two operating shafts and the indicating and registering mechanisms actuated thereby, of the toothed wheels O'' fast upon the shafts, the pivoted plate Q'' and the pawls P'' P'' pivoted thereon and movable in one direction from normal position but not in the other, and co-operating with the wheels O'' O'' to prevent simultaneous forward movement of the shafts B B but permit simultaneous backward movement of them.

12. In a cash register and indicator, the combination, with the operating shaft B and its re-setting spring, and the indicating and registering mechanisms actuated by the shaft, of the toothed wheel C'' fast upon the shaft and the escapement lever N'' co-operating therewith for the purpose specified.

THOMAS CARNEY.

Witnesses:
PEARL N. SIGLER.
JOSEPH P. CLEAL.